United States Patent Office 2,847,426
Patented Aug. 12, 1958

2,847,426

METHOD OF PREPARING TACHYSTEROL

Leon Velluz, Paris, Gaston Amiard, Noisy le Sec, and Bernard Goffinet, Paris, France, assignors to UCLAF, Paris, France, a corporation of France No Drawing. Application February 8, 1956
Serial No. 564,133

Claims priority, application France May 13, 1955

6 Claims. (Cl. 260—397.2)

This invention relates to a new process of preparing tachysterol from precalciferol.

Tachysterol, which was isolated by Windaus in the resins obtained upon irradiating ergosterol, constitutes the primary starting material for the preparation of dihydro-tachysterol, a material capable of raising the calcium level in the blood and thus preventing and eliminating parathyroid insufficiencies and tetanies.

According to Windaus (cf. Ann., 1932, 499, 188), tachysterol is obtained from the addition product which citraconic anhydride forms with part of the irradiated resins of ergosterol, or by the action of 3,5-dinitro-4-methyl-benzoyl chloride on these resins, followed by a fractional crystallization of the resulting mixture of the dinitrotoluene esters and saponification of the separated tachysterol dinitroluate. This method produces a yield of 6 to 10% tachysterol, based on the irradiated resins.

It is the principal object of the present invention to provide a new method of preparing tachysterol.

It is a further object of the invention to provide a method of preparing tachysterol from precalciferol.

It is a still further object of the invention to provide a method of preparing tachysterol with high yields.

These and other objects and advantages will be evident from the herein following description and the appended claims.

In U. S. Patent No. 2,693,475 of November 2, 1954, issued to the assignee of this application, precalciferol has been described as a new substance capable of producing vitamin $D_2$, as well as a new method of isolating this new product of the photochemical transformation of ergosterol. This patent also shows that precalciferol can be easily transformed into calciferol by simple heating without the use of luminous energy.

We have now found that tachysterol can be produced upon subjecting precalciferol to ultraviolet radiation without the use of thermal energy. This was entirely unexpected since it could not be foreseen that an intermediate of the ergosterol-vitamin $D_2$ conversion would result in either calciferol or tachysterol, depending upon whether the material was heated or irradiated.

The process to which this invention relates thus consists in irradiating precalciferol in solution in a suitable solvent such as ether, ethoxy ethanol and others, at a temperature varying between —30° C. and +20° C., preferably at about 0° C., and in isolating the tachysterol thus formed by means of previously known processes, such as forming the addition product with citraconic anhydride or the formation of the toluene ester.

Inasmuch as the irradiation of precalciferol results in an equilibrium of precalciferol and tachysterol, the portion of unchanged starting material can be readily recovered, either in form of the initial precalciferol if the separation of tachysterol is carried out in the cold, or in the form of calciferol if the reaction mixture is heated after irradiation.

The economical advantages of this invention are obvious. Starting with an irradiated resin prepared in the conventional manner and previously freed from unconverted ergosterol, it is now possible to separate a first fraction of tachysterol by following prior processes, isolate the precalciferol by applying the process described in French Patent No. 999,987 of January 21, 1949, and, finally, to convert said precalciferol into tachysterol according to this invention. The yield of the latter substance is practically doubled. It is understood that no heating should take place at any phase of these operations in order to avoid the thermal conversion of the precalciferol into calciferol, if such is not desired.

EXAMPLE 1

Irradiation of precalciferol 20.5 g. of precalciferol, obtained according to French Patent No. 999,987 of January 21, 1949, are dissolved in 800 cc. of ether. The solution is introduced in a Keller flask provided with a stirrer, an immersible mercury lamp ("Original Hanau No. S 80" of "Quarzlampengesellschaft m. b. H."), a nitrogen source and a thermometer. The solution is cooled to 0° C. and is irradiated for seven and a half hours in a current of nitrogen while the temperature is maintained between —5° and +2° C.

EXAMPLE 2

Preparation of the tachysterol-citraconic acid compound

The irradiated ether solution of Example 1 is decanted under nitrogen into a flask, and is evaporated to dryness after addition of 20 cc. of citraconic acid. 100 cc. of benzene are added to the residue, and the resulting solution is refluxed for half an hour. The solution is cooled, 60 cc. of a 16% methanolic potassium hydroxide solution are added, then 100 cc. of ether and 150 cc. of ice water. The aqueous layer is separated, diluted with water, acidified against Congo blue by means of concentrated hydrochloric acid and extracted with ether. The ether solution is washed with water, dried over magnesium sulfate and evaporated to dryness. This operation results in 7.4 g. of an orange-colored oil, consisting of the tachysterol-citraconic acid compound which corresponds to a yield of 30%.

EXAMPLE 3

Acetylation of the tachysterol-citraconic compound

The tachysterol-citraconic compound of the foregoing example is acetylated according to Windaus (cf. Ann., 1932, 499, 188). After crystallization in acetic acid a product is obtained having a melting point of 161–162° C., $[\alpha]_D^{20} = +75°$ (c=1%, chloroform), which is completely identical with a standard sample of tachysterol-citraconic anhydride acetate.

EXAMPLE 4

Recovery of calciferol

The organic phase, discarded according to Example 2 after separation of the tachysterol-citraconic compound, is dried over magnesium sulfate and evaporated to dryness under vacuum. The residue is dissolved in a mixture of 50 cc. of benzene and 30 cc. of pyridine. Thereupon, 15 g. of a solution of a 70% 3,5-dinitrobenzoyl chloride in 50 cc. of benzene are added. The sample is left standing for half an hour at room temperature, is washed with a 10% aqueous sodium bicarbonate solution with water, then with diluted hydrochloric acid, is dried over magnesium sulfate and evaporated to dryness under vacuum. The residue, weighing 17.1 g., is dissolved in a mixture of 150 cc. of benzene and 150 cc. of petroleum ether (boiling at 35–60°) and is chromatographed over 400 g. of alumina according to Brockmann. Upon elution with 2800 cc. of benzene-petroleum ether (2:1) and evaporating to dryness under vacuum, 12.4 g. of a residue are obtained which, after crystallizing in ether, produce 10.3 g. of calciferol-3,5-dinitrobenzoate, which is equal to a yield of 37%, based on the initial precalciferol. The product melts at 158–159° C., $[\alpha]_D^{20} = +57°$ (c=1%, benzene), and is completely identical with a standard sample of calciferol.

The foregoing examples are presented to illustrate the present invention, without intent, however, to thereby limit the scope of the invention in any way, thus, it will be obvious that other than the exemplified solvents may be used, that the irradiation temperature may be changed within the specified limits, and that different wave lengths may be employed. Moreover, tachysterol may be isolated and precalciferol be recovered by any other suitable methods without thereby exceeding the scope of the herein claimed invention.

We claim:

1. The method of producing tachysterol from precalciferol, which comprises subjecting a solution of precalciferol under the atmosphere of an inert gas to ultraviolet radiation at a temperature ranging from −30 to +20° C.

2. The method of producing tachysterol from precalciferol, which comprises subjecting a solution of precalciferol under the atmosphere of an inert gas to ultraviolet radiation at a temperature ranging from −30 to +20° C., separating tachysterol in the cold and recovering the unconverted portion of precalciferol.

3. The method of producing tachysterol from precalciferol, which comprises dissolving precalciferol in a solvent selected from the group consisting of ether and ethoxyethanol, subjecting the solution under a current of nitrogen to ultraviolet radiation at a temperature ranging from −30 to +20° C., separating tachysterol in the cold and recovering the unconverted portion of precalciferol.

4. The method according to claim 3, which comprises subjecting said precalciferol solution to ultraviolet radiation at a temperature ranging from −5 to +2° C.

5. The method of producing tachysterol from precalciferol, which comprises dissolving precalciferol in a solvent selected from the group consisting of ether and ethoxyethanol, subjecting the solution under a current of nitrogen to the ultraviolet radiation of a Hanau S 80 lamp at a temperature ranging from −5 to +2° C., decanting in a current of nitrogen, adding citraconic acid, evaporating to dryness, dissolving the residue in benzene, refluxing, cooling, adding potassium hydroxide in methanol, ether and ice water, separating into an aqueous layer and an organic layer, and separating tachysterol from the aqueous layer as an addition product with citraconic anhydride.

6. The method of producing tachysterol from precalciferol, which comprises dissolving precalciferol in ether, subjecting the solution under a current of nitrogen to the ultraviolet radiation of a Hanau S 80 lamp at a temperature ranging from −5 to +2° C., decanting in a current of nitrogen, adding citraconic acid, evaporating to dryness, dissolving the residue in benzene, refluxing, cooling, adding potassium hydroxide in methanol, ether and ice water, separating into an aqueous layer and an organic layer, and recovering tachysterol from the aqueous layer as an addition product with citraconic anhydride and recovering calciferol from the organic layer.

References Cited in the file of this patent

UNITED STATES PATENTS

| | | |
|---|---|---|
| 1,902,745 | Windaus | Mar. 21, 1933 |
| 1,902,785 | Linsert | Mar. 21, 1933 |
| 2,030,377 | Linsert | Feb. 11, 1936 |
| 2,099,550 | Windaus | Nov. 16, 1937 |
| 2,693,475 | Velluz | Nov. 2, 1954 |

OTHER REFERENCES

Fieser and Fieser, Natural Products Relating to Phenanthrene, pp. 168–178 (1949).